United States Patent
Lee et al.

(10) Patent No.: US 8,823,917 B2
(45) Date of Patent: Sep. 2, 2014

(54) ELECTRIC FIELD DRIVEN LIQUID CRYSTAL LENS CELL AND STEREOSCOPIC IMAGE DISPLAY DEVICE USING THE SAME

(75) Inventors: Byung-Joo Lee, Seoul (KR); Sung-Woo Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 432 days.

(21) Appl. No.: 12/966,090

(22) Filed: Dec. 13, 2010

(65) Prior Publication Data

US 2011/0157499 A1      Jun. 30, 2011

(30) Foreign Application Priority Data

Dec. 24, 2009   (KR) ........................ 10-2009-0131048

(51) Int. Cl.
*G02F 1/13*       (2006.01)
*G02F 1/1335*   (2006.01)
*G02F 1/1339*   (2006.01)

(52) U.S. Cl.
USPC .............................. 349/200; 349/15; 349/155

(58) Field of Classification Search
USPC ............................................ 349/15, 155, 200
See application file for complete search history.

(56) References Cited

U.S. PATENT DOCUMENTS

| | | | |
|---|---|---|---|
| 2009/0153653 A1 | 6/2009 | Lee et al. | |
| 2009/0153754 A1* | 6/2009 | Jung | 349/15 |
| 2009/0168167 A1 | 7/2009 | Hiroya et al. | 359/477 |
| 2009/0168187 A1 | 7/2009 | Woodgate et al. | 359/623 |
| 2010/0026920 A1* | 2/2010 | Kim et al. | 349/15 |
| 2011/0157499 A1* | 6/2011 | Lee et al. | 349/15 |

FOREIGN PATENT DOCUMENTS

| | | | |
|---|---|---|---|
| EP | 0 258 996 B1 | 6/1993 | G02B 6/12 |
| KR | 10-2009-0063534 A | 6/2009 | |
| KR | 10-2009-0065934 A | 6/2009 | |

OTHER PUBLICATIONS

European Search Report dated Apr. 29, 2011—European Application No. 10176343.1.
Office Action dated Jan. 31, 2013, issued by the Korean Patent Office for counterpart Korean patent application No. 10-2009-0131048.

* cited by examiner

*Primary Examiner* — Bumsuk Won
*Assistant Examiner* — Charles Chang
(74) *Attorney, Agent, or Firm* — Morgan, Lewis & Bockius LLP

(57) ABSTRACT

An electric field driven liquid crystal lens cell including a first substrate and a second substrate arranged opposite each other, a first plurality of split electrodes formed on the first substrate, each of the first plurality of split electrodes corresponding to one of a plurality of lens regions, a second electrode formed over an entire first surface of the second substrate, a voltage source to apply differing voltages to the first and second plurality of split electrodes, a spacer formed between the first substrate and the second substrate, the location of the spacer corresponding to the vertex of the lens when voltages are applied to at least one of the first plurality of split electrodes and the second electrode, and a liquid crystal layer disposed between the first substrate and the second substrate.

15 Claims, 8 Drawing Sheets

ELECTRIC FIELD DRIVEN LIQUID CRYSTAL LENS CELL AND STEREOSCOPIC IMAGE DISPLAY DEVICE USING THE SAME

This application claims the benefit of Korean Patent Application No. P2009-0131048 filed on Dec. 24, 2009, which is hereby incorporated by reference.

BACKGROUND OF THE INVENTION

1. Field of the Invention

The present invention relates to a display device, and more particularly, to an electric field driven liquid crystal lens in which the position of a spacer is adjustable to prevent a lens surface error, and a stereoscopic display device using the same.

2. Discussion of the Related Art

At present, services for rapid dissemination of information, based on the construction high-speed information communication networks, have developed from a simple "listening and speaking" service, such as current telephones, to a "watching and listening" multimedia type service based on digital terminals used for high-speed processing of characters, voices, and images. Ultimately, such services are expected to be developed into hyperspace 3-dimensional (3D) stereoscopic information communication services enabling virtual reality and stereoscopic viewing free from the restrains of time and space.

In general, stereoscopic images representing 3-dimensions are realized based on the principle of stereo-vision via the viewer's eyes. However, since the viewer's eyes are spaced apart from each other by about 65 mm, i.e. a binocular parallax, the left and right eyes perceive slightly different images due to a positional difference between the two eyes. Such an image difference due to the positional difference between the two eyes is called binocular disparity. A 3D stereoscopic image display device is designed based on binocular disparity, allowing the left eye to view only an image for the left eye and the right eye to view only an image for the right eye.

Specifically, the left and right eyes view different 2-dimensional (2D) images, respectively. If the two different images are transmitted to the brain through the retina, the brain accurately combines the images, reproducing depth perception and realism of an original 3D image. This ability is referred to as stereoscopy (stereography), and a display device to which stereoscopy is applied is referred to as a stereoscopic display device.

In the meantime, stereoscopic display devices may be classified based on constituent elements of a lens which realizes 3D images. In one example, a lens using a liquid crystal layer is referred to as an electric field driven liquid crystal lens.

Generally, a liquid crystal display device includes two electrodes opposite each other, and a liquid crystal layer interposed between the two electrodes. Liquid crystal molecules of the liquid crystal layer are driven by an electric field created when voltages are applied to the two electrodes. The liquid crystal molecules have polarization and optical anisotropy characteristics. Here, polarization refers to a change in molecular alignment according an electric field, which is caused as electrons in liquid crystal molecules are gathered to opposite sides of the liquid crystal molecules when the liquid crystal molecules are under the influence of an electric field. Also, optical anisotropy refers to a change in path or polarization of light to be emitted according to an incidence direction or polarization of incident light, which is caused by an elongated shape of liquid crystal molecules and the above-mentioned molecular arrangement direction.

Accordingly, the liquid crystal layer has a transmittance difference due to voltages applied to the two electrodes, and is able to display an image by varying the transmittance difference on a per pixel basis.

Recently, an electric field driven liquid crystal lens in which a liquid crystal layer serves as a lens based on the above-described characteristics of liquid crystal molecules has been proposed.

Specifically, a lens is designed to control a path of incident light on a per position basis using a difference between a refractive index of a lens constituent material and a refractive index of air. In the electric field driven liquid crystal lens, if different voltages are applied to electrodes located at different positions of the liquid crystal layer so as to create an electric field required to drive the liquid crystal layer, incident light introduced into the liquid crystal layer undergoes different phase variations on a per position basis, and as a result, the liquid crystal layer is able to control the path of the incident light in the same manner as an actual lens.

An electric field driven liquid crystal lens according to the related art will be now described with reference to the accompanying drawings. FIG. 1 is a sectional view illustrating the electric field driven liquid crystal lens according to the related art, and FIG. 2 is a schematic view illustrating a conformation of the electric field driven liquid crystal lens of FIG. 1.

As illustrated in FIG. 1, the electric field driven liquid crystal lens according to the related art includes first and second substrates 10 and 20 opposite each other, and a liquid crystal layer 30 formed between the first substrate 10 and the second substrate 20. First electrodes 11 are arranged on the first substrate 10 and are spaced apart from one another by a first distance. In the two neighboring first electrodes 11, a distance from the center of one first electrode 11 to the center of the other first electrode 11 is referred to as a "pitch". Repeating the same pitch for the respective first electrodes results in a pattern. A second electrode 21 is formed over the entire surface of the second substrate 20 opposite the first substrate 10.

The first and second electrodes 11 and 21 are made of transparent metal. The liquid crystal layer 30 is formed in a space between the first electrodes 11 and the second electrode 21. Liquid crystal molecules of the liquid crystal layer 30 have a parabolic potential surface due to a property reacting according to the intensity and distribution of an electric field and thus, have a phase distribution similar to that of the electric field driven liquid crystal lens as illustrated in FIG. 2.

In addition, ball spacers 40 are distributed to support a gap between the first substrate 10 and the second substrate 20. These ball spacers 40 are randomly dispersed on any one of the first substrate 10 and the second substrate 20 and thus, have mobility on the substrate rather than being fixed at specific positions.

The above-described electric field driven liquid crystal lens is realized under the condition that high voltages are applied to the first electrode 11 and the second electrode 21 is grounded. With this voltage condition, a vertical electric field is strongest at the center of the first electrode 11, and the intensity of the vertical electric field decreases away from the first electrode 11. Accordingly, if the liquid crystal molecules of the liquid crystal layer 30 have positive dielectric anisotropy, the liquid crystal molecules are arranged according to the electric field in such a way that the liquid crystal molecules are upright at the center of the first electrode 11 and are gradually tilted approximately horizontally away from the first electrode 11. As a result, in view of light transmission, an optical path is shortened at the center of the first electrode 11, and is lengthened with increasing distance from the first electrode 11, as illustrated in FIG. 2. Representing the length variation of the optical path using a phase surface, the electric field driven liquid crystal lens has light transmission effects similar to a lens having a parabolic surface. Here, the second electrode 21 causes behavior of the electric field created by the liquid crystal molecules, making a refractive index of light spatially take the form of a parabolic function. The first electrode 11 corresponds to a lens edge region.

In this case, relatively high voltages are applied to the first electrodes 11 rather than the second electrode 21. Therefore, as illustrated in FIG. 2, an electric potential difference occurs between the first electrodes 11 and the second electrode 21. In particular, a steep lateral electric field is created around the first electrodes 11. Accordingly, liquid crystals have a slightly distorted distribution rather than a predetermined distribution, whereby a refractive index of light cannot exhibit parabolic spatial distribution, or movement of the liquid crystals is excessively sensitive to voltage variation.

The above-described electric field driven liquid crystal lens according to the related art may be realized, without a lens having a parabolic surface, by arranging electrodes on two substrates with liquid crystals interposed therebetween and applying voltages to the electrodes.

FIGS. 3A and 3B are a plan view and a sectional view, respectively, illustrating a region occupied by a spacer and a region having an effect on transmission of light due to the existence of the spacer.

For example, if it is assumed that a ball spacer 45 is located at a position of an electric field driven liquid crystal lens as illustrated in FIG. 3A, an area defined by tripling the diameter of the ball spacer 45 as illustrated in FIG. 3B may intercept transmission of light directed from the bottom of the electric field driven liquid crystal lens, or light may be refracted at a surface of the ball spacer 45, causing distortion of light to be transmitted.

Distortion in transmission of light occurs in an area of $(3r)^2\pi$ where "r" represents radius of the spacer 45. Actually, this distortion occurs in an area equal to 9 times an area occupied by the ball spacer 45. For example, if it is assumed that the ball spacer 45 occupies 0.5% of the entire substrate area, the above described distortion occurs in an area of 4.5% of the entire substrate area. Therefore, a distorted lens surface may be identified with the naked eye, or an abnormal 3D display region may occur.

The above-described electric field driven liquid crystal lens in the related art has the following problems. First, it is necessary to provide a spacer to maintain an interval between the first substrate and the second substrate in consideration of mobility of the liquid crystals filled between the first substrate and the second substrate. However, the spacer itself cannot function as a lens. Even a region around the spacer may exhibit distortion in a transmission direction of light, or may intercept light due to the existence of the spacer. Second, the distortion in the transmission of light occurs in an area equal to approximately 9 times an area of the spacer, rather than occurring only in an area of the spacer and thus, the entire electric field driven liquid crystal lens may exhibit a distinguishable lens error as the distortion occurs due to light transmitted laterally. Third, the function of the related art electric field driven liquid crystal lens may deteriorate. If lens error occurs, respective lens regions of the electric field driven liquid crystal lens may have different refractive indices and in turn, such a refractive index difference may cause an irregular lens interface.

SUMMARY OF THE INVENTION

Accordingly, the present invention is directed to an electric field driven liquid crystal lens cell and stereoscopic image display device using the same that substantially obviates one or more problems due to limitations and disadvantages of the related art.

An object of the present invention is to provide an electric field driven liquid crystal lens in which the position of a spacer is adjustable to prevent a lens surface error, and a stereoscopic display device using the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an electric field driven liquid crystal lens cell and stereoscopic image display device using the same includes an electric field driven liquid crystal lens cell including a first substrate and a second substrate arranged opposite each other, a first plurality of split electrodes formed on the first substrate, each of the first plurality of split electrodes corresponding to one of a plurality of lens regions, a second electrode formed over an entire first surface of the second substrate, a voltage source to apply differing voltages to the first and second plurality of split electrodes, a spacer formed between the first substrate and the second substrate, the location of the spacer corresponding to the vertex of the lens when voltages are applied to at least one of the first plurality of split electrodes and the second electrode, and a liquid crystal layer disposed between the first substrate and the second substrate.

In another aspect, the electric field driven liquid crystal lens cell and stereoscopic image display device using the same includes a stereoscopic image display device including a display panel to emit a 2-dimensional (2D) image signal, and an electric field driven liquid crystal lens that converts the 2D image signal into a 3-dimensional (3D) image signal, the electric field driven liquid crystal lens including a first substrate and a second substrate arranged opposite each other, a first plurality of split electrodes formed on the first substrate, each of the first plurality of split electrodes corresponding to one of a plurality of lens regions, a second electrode formed over an entire first surface of the second substrate, a voltage source to apply different voltages to the first and second plurality of split electrodes, a spacer formed between the first substrate and the second substrate, the location of the spacer corresponding to the vertex of the lens when voltages are applied to at least one of the first plurality of split electrodes and the second electrode, and a liquid crystal layer disposed between the first substrate and the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the embodiments of the present invention, examples of which are illustrated in the accompanying drawings.

Figure 1:
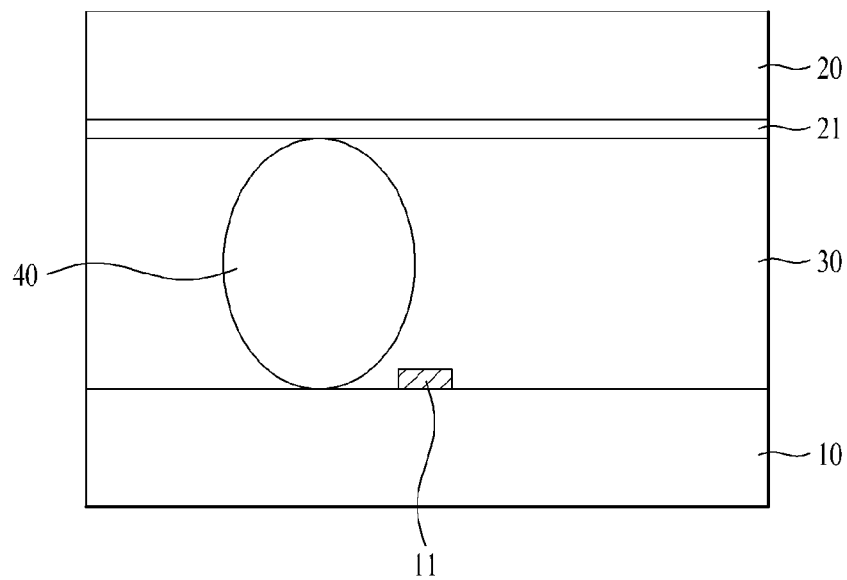
FIG. 1 is a sectional view illustrating an electric field driven liquid crystal lens according to the related art.
Figure 2:
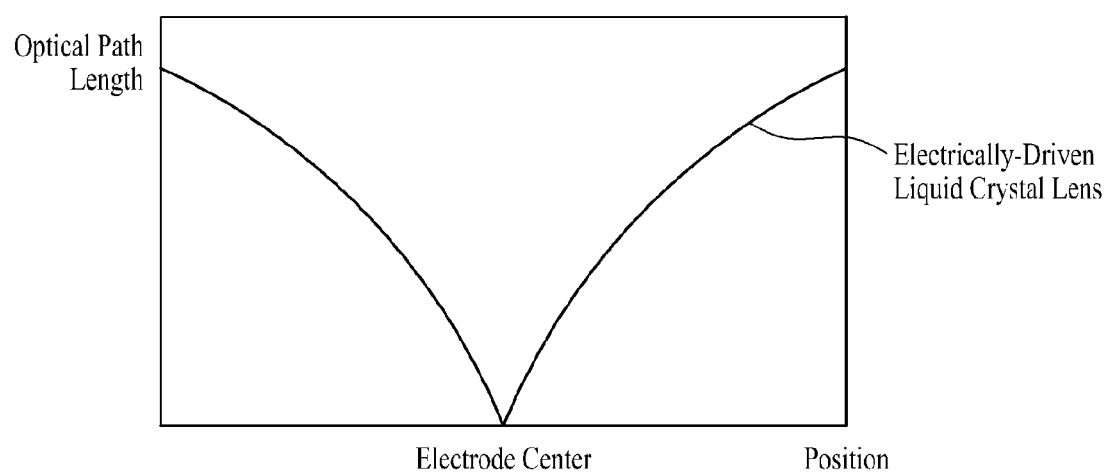
FIG. 2 is a schematic view illustrating a lens conformation realized by the electric field driven liquid crystal lens of FIG. 1 according to the related art.
Figure 3A:
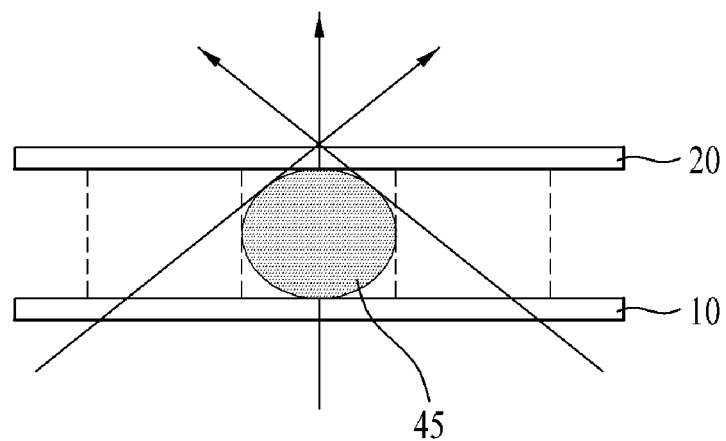
FIGS. 3A and 3B are a plan view and a sectional view, respectively, illustrating a region occupied by a spacer and a region having an effect on transmission of light due to the existence of the spacer.
Figure 3B:
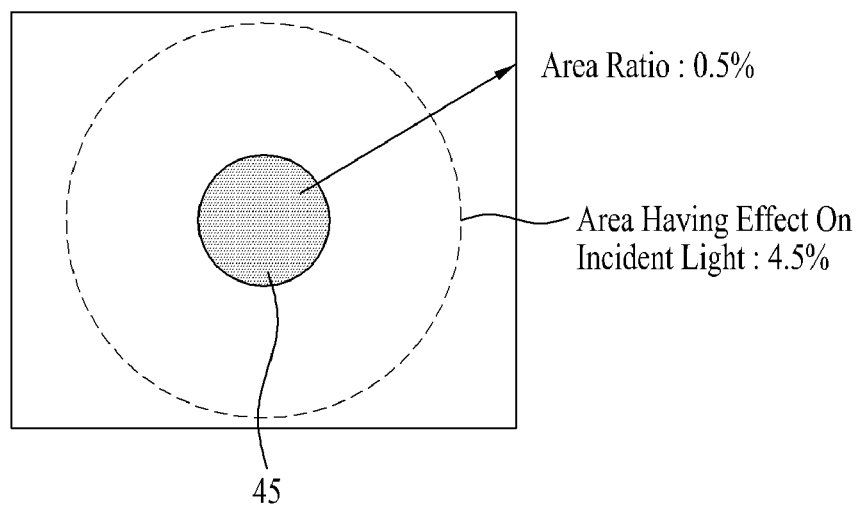
Figure 4:
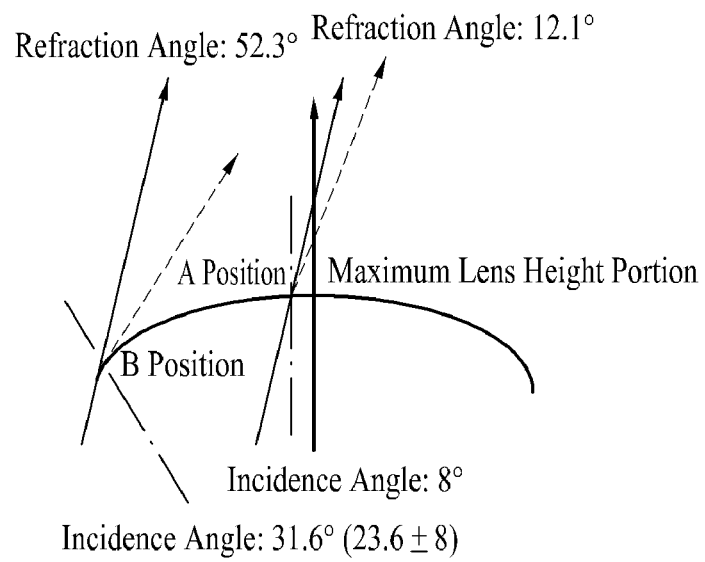
FIG. 4 is a view illustrating incidence angles and refraction angles at different lens surface regions under the assumption of arranging column spacers at "A" and "B" positions.

FIG. 4 is a view illustrating incidence angles and refraction angles at different lens surface regions under the assumption of arranging column spacers at "A" and "B" positions.

As illustrated in FIG. 4, when light emitted from a light source below a lens transmits through a lens surface, straight incident light directly transmits through the lens surface and travels in a straight path, whereas light is incident on the edge of the lens surface by a predetermined inclination angle and thereafter, exits from the lens surface at a predetermined refraction angle. This occurs since the lens surface has a curvature and since it is centrally provided with a column spacer. For example, as illustrated in FIG. 4, if it is assumed that a column spacer is located at the "A" position, light enters the lens surface at an incidence angle of 8 degrees and exits from the lens surface at a refraction angle of about 12.1 degrees. A difference between the incidence angle and the refraction angle is about 4.5 degrees. On the other hand, if it is assumed that a column spacer is located at the "B" position, light enters the lens surface at an incidence angle of 31.6 degrees and exits from the lens surface at a refraction angle of about 52.3 degrees. A difference between the incidence angle and the refraction angle is about 20.7 degrees. Thus, it can be appreciated that a refraction angle becomes greater than an incidence angle toward the edge of the lens surface and the center of the lens surface is less affected by an incidence angle in view of lens function. In addition, it can be appreciated that a lens error is worsened toward the edge of the lens surface.

Figure 5:
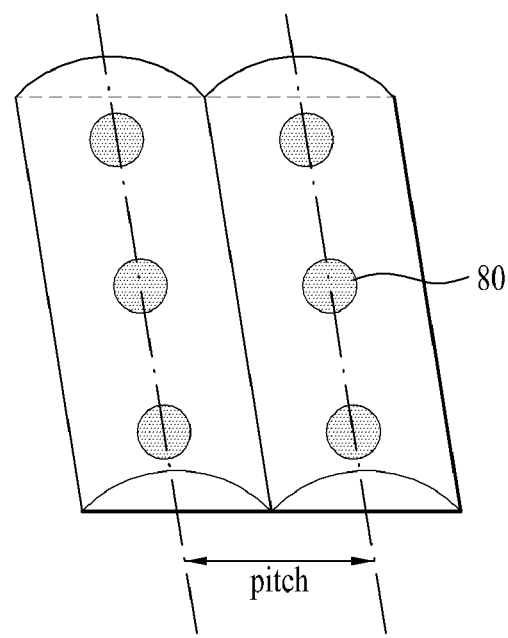
FIG. 5 is a perspective view illustrating an electric field driven liquid crystal lens according to a first exemplary embodiment of the present invention.
Figure 6:
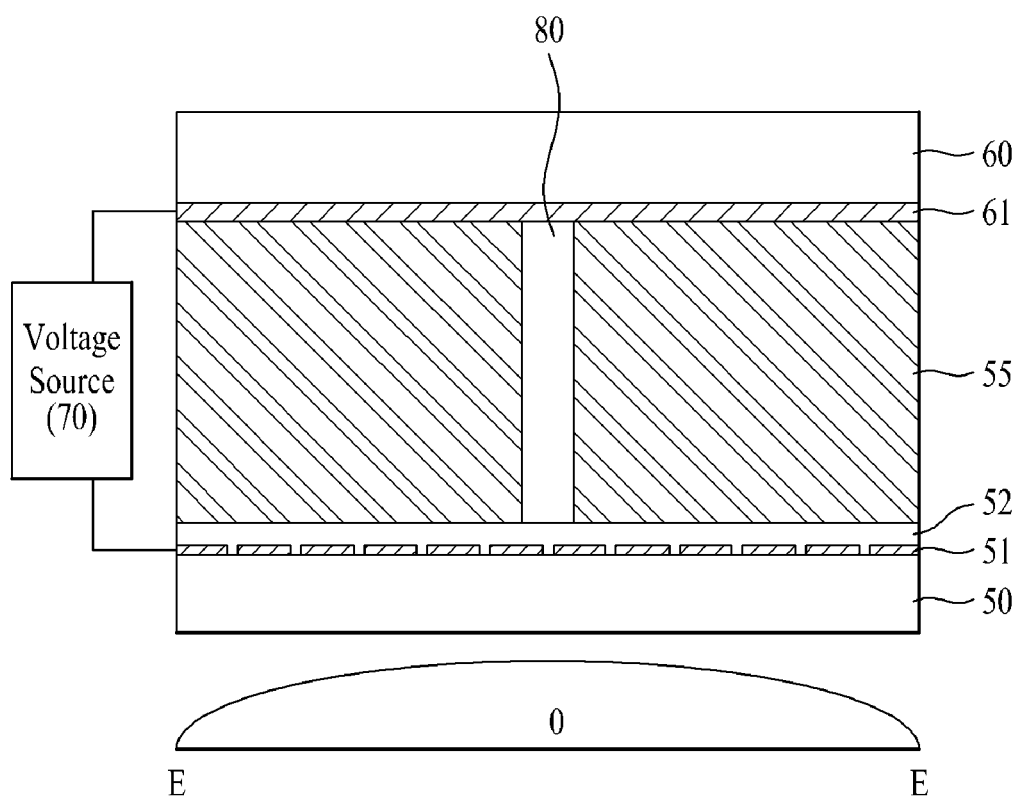
FIG. 6 is a sectional view of FIG. 5.

FIG. 5 is a perspective view illustrating an electric field driven liquid crystal lens according to a first exemplary embodiment of the present invention, and FIG. 6 is a sectional view of FIG. 5.

As illustrated in FIGS. 5 and 6, the electric field driven liquid crystal lens according to the first exemplary embodiment of the present invention is devised in consideration of the above described characteristics observed from FIG. 4. The electrically driven liquid crystal lens includes first substrate 50, second substrate 60, voltage source 70, first electrodes 51, spacer 80, second electrode 61, lens region L, and liquid crystal layer 55. The first substrate 50 and a second substrate 60 arranged opposite each other and each defining a plurality of lens regions to correspond to those of the other substrate. The plurality of first electrodes 51 are spaced apart from one another on the first substrate 50 in each lens region L. The second electrode 61 is formed over substantially the entire surface of the second substrate 60. The voltage source 70 applies voltages, which gradually increase from the center to the edge of the lens region, to the first electrodes 51, and also applies a threshold voltage to the second electrode 61 so as to realize a parabolic lens on a per lens region basis. The spacer 80 is formed between the first substrate 50 and the second substrate 60 at a position corresponding to the maximum lens height portion generated when voltages are applied to the first electrodes 51 and the second electrode 61. The liquid crystal layer 55 is filled between the first substrate 50 and the second substrate 60.

Here, the spacer 80 is positioned to correspond to the maximum lens height portion, as illustrated in FIG. 4, so that the spacer 80, positioned at the center of the lens region where an incidence angle and an emission angle substantially have the same zero angle, can act to alleviate distortion in transmission of light even if straight light collides with the spacer 80. Thus, an emission angle of the light out of the lens surface has a small value.

The spacer 80, for example, is a stationary spacer and may be a stationary ball spacer or polygonal column spacer. To form a stationary ball spacer, a ball spacer is mixed in a solvent and is dotted at a predetermined position on a substrate. The spacer may be applied by an ink jet printer head and then, the dotted ball spacer is fixed on a substrate by volatizing the solvent via heating or the like. If the spacer is located at a portion except for the maximum lens height portion, obliquely incident light reaches a lens surface after a transmission direction of the light is distorted by the spacer. In this case, the light may exit at an excessive refraction angle, or may be directed in a direction different from an original transmission direction thereof. More specifically, when an incidence angle and refraction angle of light excessively deviate from normal ranges when passing through a spherical lens surface, this is referred to as a lens error. Considering the lens error with relation to the spacer, it is observed that the lens error becomes significant when the spacer is positioned at a region having a great tangential angle in relation to a lens surface, i.e., toward the lens edge.

Accordingly, in the electric field driven liquid crystal lens according to the first exemplary embodiment of the present invention, it is proposed that the spacer be positioned at the maximum lens height portion to have a less or no effect on distortion in the transmission of light.

Here, with respect to the plurality of first electrodes 51 formed in the lens region, for example, the smallest voltage is applied to one of the first electrodes 51 located at the center O of the lens region, and voltages to be applied to the remaining first electrodes 51 in the lens region gradually increase toward the edge E of the lens region.

The first electrodes 51 may be formed in a single layer as illustrated, or may be divided into different layers with an insulating film interposed therebetween. In the latter case, the electrodes formed in the different layers may be positioned alternately.

Voltages V0, V1, V2, . . . Vmax are applied from the voltage source 70 to the plurality of first electrodes 51 in each lens region via metal lines (not shown) connected between the voltage source 70 and one end of the respective first electrodes 51. The voltage applied to the second electrode 61 is 0V, or is a threshold voltage lower than the voltage values applied to the first electrodes 51.

As shown in FIG. 6, insulating film 52 protects the first electrodes. The insulating film 52 may also be omitted. In addition, alignment films are formed respectively on the insulating film 52 and the second electrode 61 and serve to initially align the liquid crystal layer 55.

The electric field driven liquid crystal lens functions to emit a 3D image signal from a 2D image signal according to the profile of a lens surface. Although the electric field driven liquid crystal lens is located on a display panel (not shown) that realizes a 2D image, the electric field driven liquid crystal lens is able to selectively emit a 3D image signal or 2D image signal according to whether or not voltage is applied thereto. Specifically, since the electric field driven liquid crystal lens is designed to directly transmit light when no voltage is applied thereto, the electric field driven liquid crystal lens may have a switching function to display a 2D image when no voltage is applied thereto, or to display a 3D image when voltage is applied thereto.

Here, the first electrodes 51 and the second electrode 61 are made of transparent metal, and prevent loss of transmittance at locations where these electrodes 51 and 61 are arranged.

Upon formation of the electric field driven liquid crystal lens that realizes a single parabolic lens corresponding to each lens region, a first voltage V0 approximately corresponding to a threshold voltage is applied to the center of the lens region, and the highest nth voltage Vmax is applied to the first electrode 51 positioned at the edge of the lens region. In this case, voltages applied to the first electrodes 51 positioned between the center and the edge of the lens region gradually increase away from the center of the lens region within a range from the first voltage V0 to the nth voltage Vmax. Once the voltages are applied to the plurality of first electrodes 51, a ground voltage or threshold voltage is applied to the second electrode 61, whereby a vertical electric field is created between the first electrodes 51 and the second electrode 61.

The plurality of first electrodes 51 in the lens region is horizontally symmetrical on the basis of the edge of the lens region. The voltage source 70 applies the voltages V0, V1, V2, . . . Vmax to the respective first electrodes 51 in a pad portion (corresponding to a non-display portion of a display panel).

Here, the lowest one of the voltages applied to the first electrodes 51, i.e. the threshold voltage V0 is an alternating current (AC) square wave voltage having a peak value of about 1.4~2V. The threshold voltage V0 is given by $$V = \pi \sqrt{\frac{K1}{\Delta \varepsilon \varepsilon 0}}$$

where, $\Delta \in$ is the dielectric anisotropy of liquid crystals, K1 is the modulus of elasticity of liquid crystals, and $\in 0$ is a free-space dielectric constant. In addition, the highest voltage Vmax of the voltages applied to the first electrodes 51, i.e. the voltage applied to the first electrode 51 positioned at the edge of the lens region is an AC square wave voltage having a peak value of about 2.5~10V.

The above described lens region as illustrated in FIGS. 5 and 6 is horizontally repeated at an interval of a pitch P.

The plurality of first electrodes 51 may take the form of bars extending in a crosswise direction of the first substrate 50 (in the direction into the drawing), and the width of each first electrode 51 is 1~10 μm, and a distance between the neighboring first electrodes 51 is 1~10 μm. For example, the pitch may be variable in a range of 90 μm to 1000 μm. Approximately ten to one hundred or more first electrodes 51 may be formed on a per lens region basis according to the above described width and distance.

A seal pattern (not shown) is formed at an outer peripheral region of the first and second substrates 50 and 60 (i.e. a non-display region including a pad portion) to maintain a gap between the first substrate 50 and the second substrate 60. The liquid crystal layer 55 between the first substrate 50 and the second substrate 60 must have a sufficient thickness equal to a value obtained by adding a predetermined margin to the maximum height of a parabolic lens, in order to form a sufficient phase of the electric field driven liquid crystal lens. To stably maintain the thickness of the liquid crystal layer 55, ball spacers or column spacers may be further provided to support a cell gap between the first substrate 50 and the second substrate 60. In this case, it is advantageous to position the spacers so as not to distort the phase of the electric field driven liquid crystal lens.

Figure 7A:
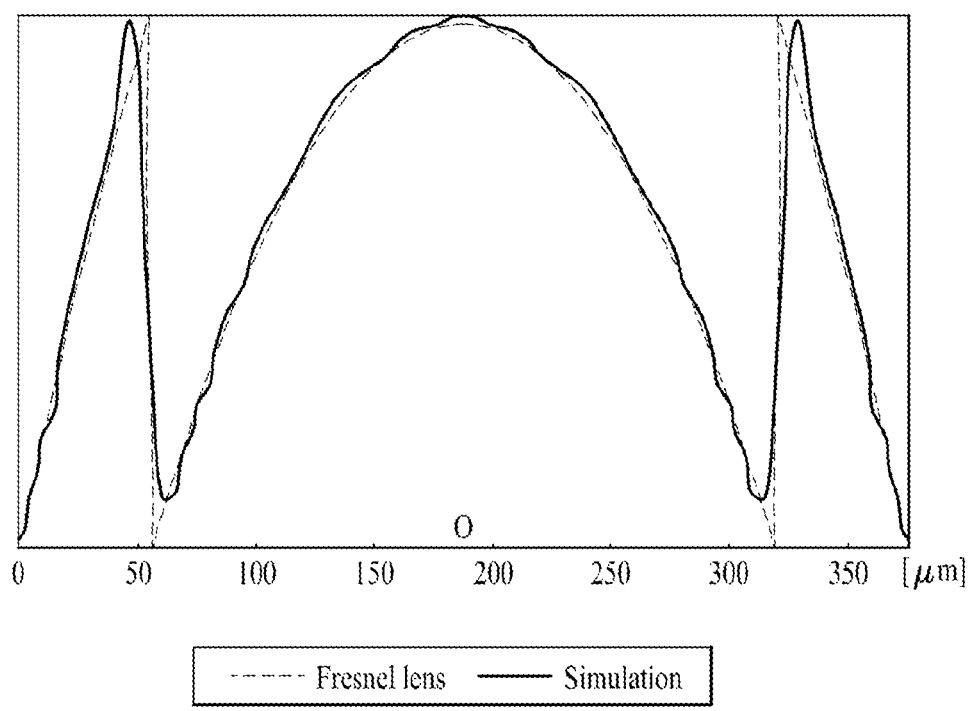
FIGS. 7A and 7B are schematic sectional views of an electric field driven liquid crystal lens according to a second exemplary embodiment of the present invention, illustrating a partial region corresponding to column spacers.
Figure 7B:
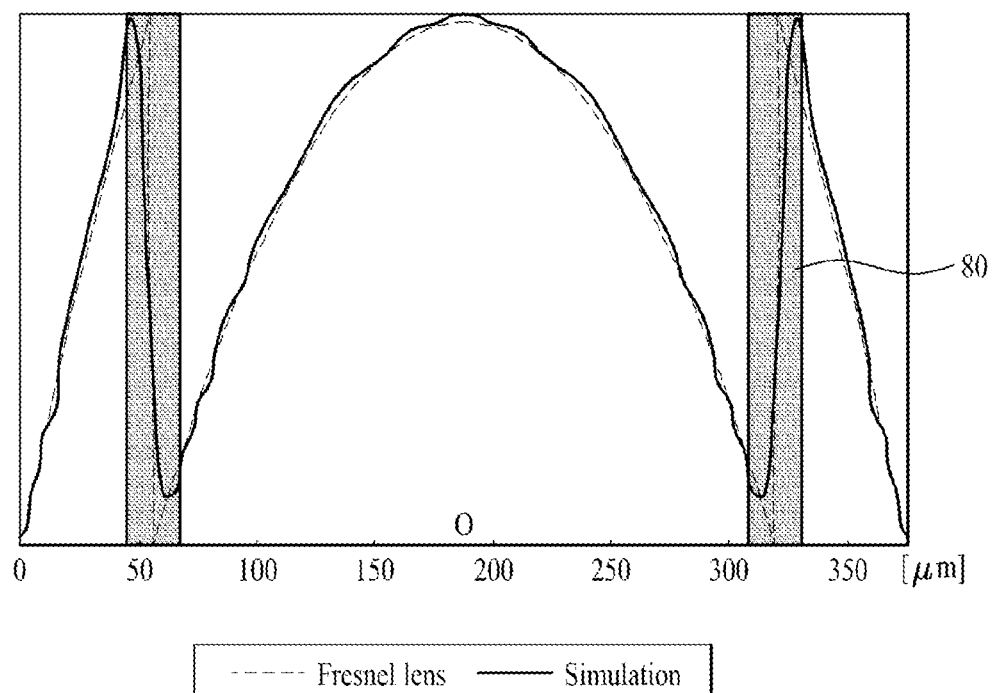
Figure 8:
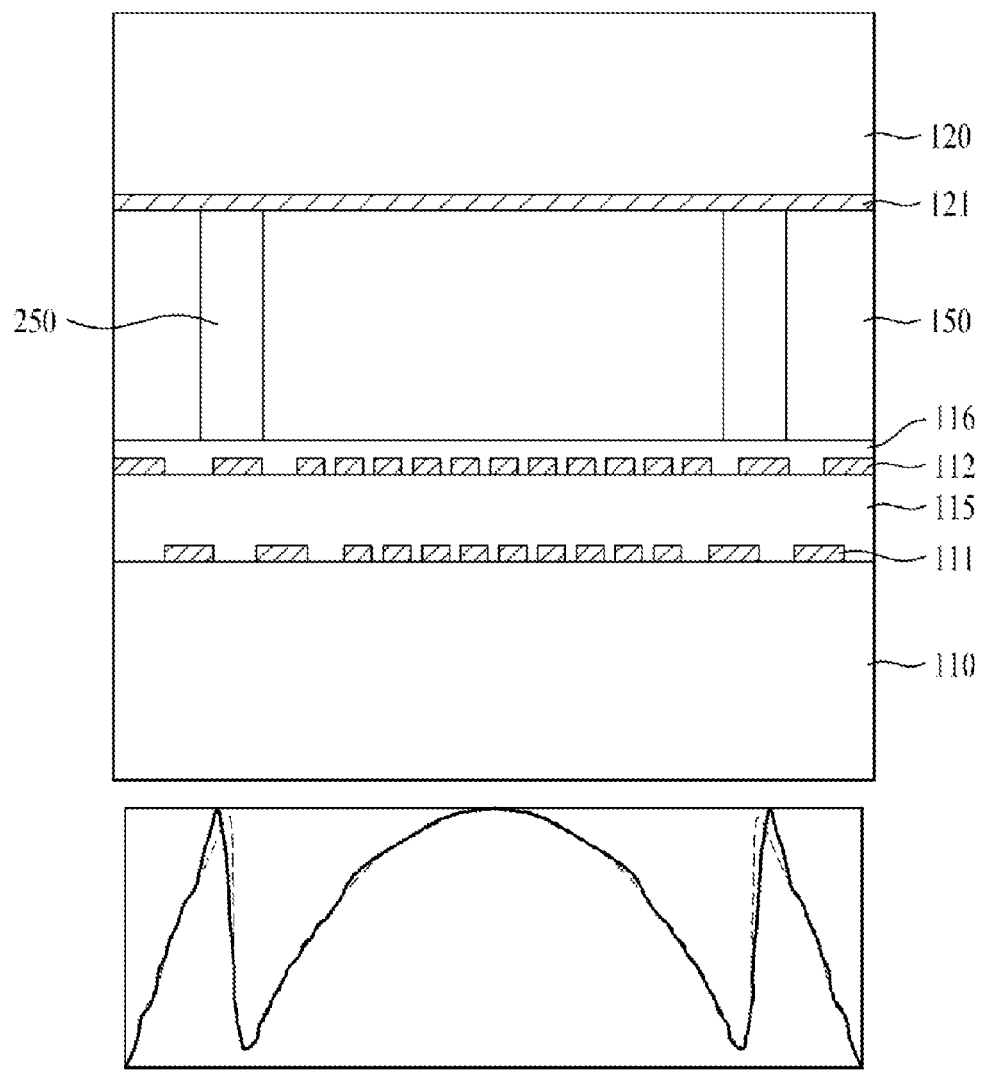
FIG. 8 is a sectional view of the electric field driven liquid crystal lens according to the second exemplary embodiment of the present invention.

FIGS. 7A and 7B are schematic sectional views of an electric field driven liquid crystal lens according to a second exemplary embodiment of the present invention, illustrating a partial region corresponding to the column spacers. FIG. 8 is a sectional view of the electric field driven liquid crystal lens according to the second exemplary embodiment of the present invention.

As illustrated in FIG. 8, the electric field driven liquid crystal lens according to the second exemplary embodiment of the present invention includes first substrate 110, second substrate 120, a plurality of first electrodes 111 and 112, second electrode 121, column spacers 250, and liquid crystal layer 150. The first substrate 110 and a second substrate 120 are arranged opposite each other and each defining a plurality of lens regions corresponding to those of the other substrate, a plurality of first electrodes 111 and 112 spaced apart from one another on the first substrate 110 in each lens region. The second electrode 121 is formed over the entire surface of the second substrate 120. The voltage source (not shown) applies different voltages to the first electrodes 112 and 112 on a per sub region basis so as to allow a plurality of sub regions defined in each lens region to have the maximum height at different portions thereof, and also applies a threshold voltage to the second electrode 121, column spacers 250 formed at boundaries of the sub regions, and a liquid crystal layer 150 filled between the first substrate 110 and the second substrate 120.

In the second exemplary embodiment, the first electrodes 111 and 112 may be divided into two layers with an insulating film 115 interposed therebetween as illustrated, or may be formed in a single layer in the same manner as the above described first exemplary embodiment. If it is desirable to finely divide the first electrodes according to desired voltage conditions, the illustrated double layer structure or multi-layer structure may be adopted.

The electric field driven liquid crystal lens according to the second exemplary embodiment of the present invention may be realized based on a Fresnel lens, in which each lens region is divided into a plurality of sub regions and the respective sub regions have the maximum height at different positions thereof. The sub regions of the Fresnel lens have different pitches and shapes and thus, as illustrated in FIGS. 7A and 7B, interfaces of the sub regions may define discontinuous zones. The discontinuous zones are lens error regions in which the lens height is variable and thus, display of a stereoscopic image is impossible. In the electric field driven liquid crystal lens according to the second exemplary embodiment of the present invention, as illustrated in FIGS.

7A and 7B, the column spacers 250 are positioned at the discontinuous zones of the sub regions, i.e. discontinuous lens zones that cause crosstalk. The respective sub regions may have the same lens height as illustrated, or may have different lens heights.

When the column spacers 250 are arranged at the discontinuous zones of the sub regions that do not exhibit normal lens surface effects, it is possible to prevent transmission of light through the discontinuous zones of the sub regions. In addition, previously arranging the column spacers 250 at regions that may generate a lens error has the effect of restricting the lens error.

Preferably, the column spacers 250 have a diameter equal to or smaller than the width of the discontinuous zones of the sub regions.

As shown in FIGS. 7A and 7B, the electric field driven liquid crystal lens according to the second exemplary embodiment of the present invention has a pitch of about 370 μm, and the discontinuous zones in which the column spacers 250 are positioned are in a range of about 44~65 μm from left and right edges. In the second exemplary embodiment, the column spacers 250 are positioned to correspond to zones having a possibility of serious lens error.

In FIG. 8, protective film 116 protects the first electrodes 112 and may be omitted. In addition, alignment films may be formed respectively on the protective film 116 and the second electrode 121 and serve to initially align alignment the liquid crystal layer 150.

To realize a stereoscopic display device including the electric field driven liquid crystal lens, a light source and a display panel to transmit a 2D image signal may be further provided below the electric field driven liquid crystal lens. Also, if the display panel is a light emitting device, the light source may be omitted.

Figure 9:
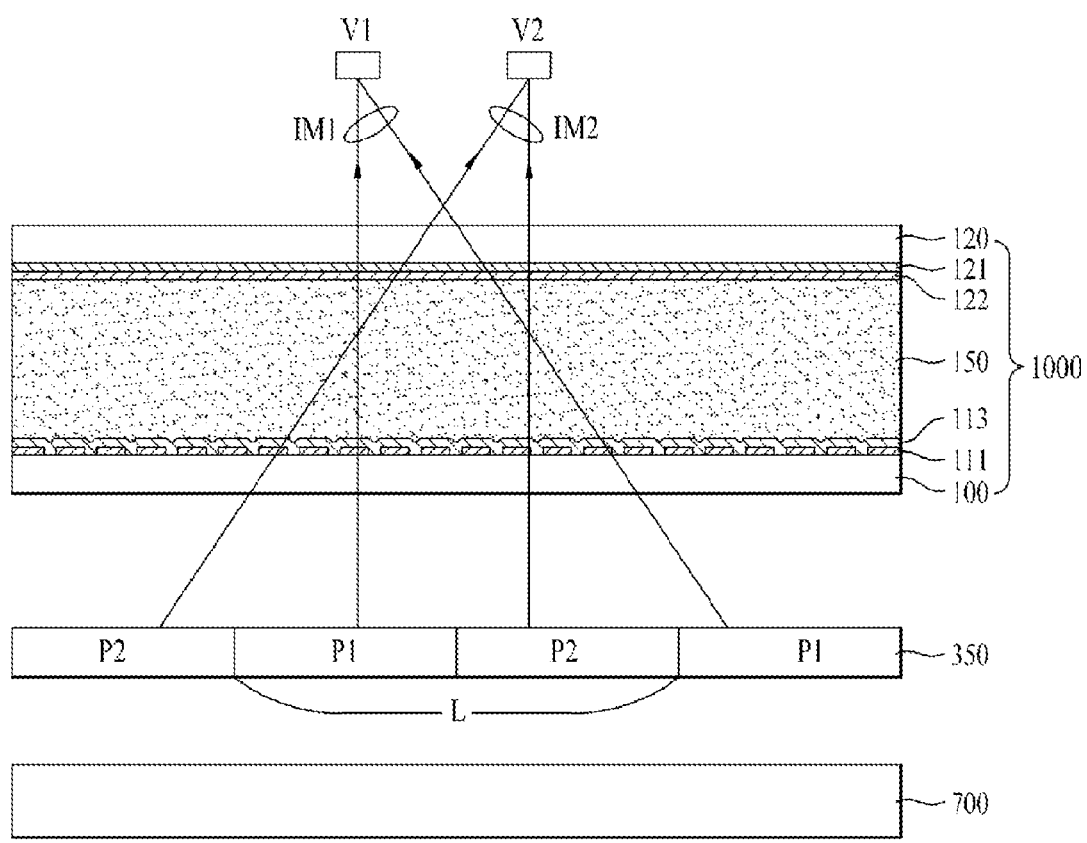
FIG. 9 is a sectional view illustrating a display device including the electric field driven liquid crystal lens according to exemplary embodiments of the present invention.

FIG. 9 is a sectional view illustrating a display device including the electric field driven liquid crystal lens according to the present invention.

As illustrated in FIG. 9, the stereoscopic display device of the present invention includes an electric field driven liquid crystal lens 1000, a display panel 350, and a light source 700. The electric field driven liquid crystal lens 1000, which is driven upon receiving voltages, thereby functions as a lens. The display panel 350, which is disposed below the electric field driven liquid crystal lens 1000, emits 2D image information. Light source 700, which is disposed below the display panel 350, emits light to the display panel 350. If the display panel 350 is a self-illumination device, omission of the light source 700 is possible.

The display panel 350 contains first and second image pixels P1 and P2 alternately and repeatedly arranged to display first and second images IM1 and IM2, respectively. The display panel 350 may be selected from various flat-panel displays including a liquid crystal display (LCD), organic light emitting display (OLED), plasma display panel (PDP), field emission display (FED), etc. The display panel 350 is located below the electric field driven liquid crystal lens 1000, and serves to transmit a 2D image signal to the electric field driven liquid crystal lens 1000.

The electric field driven liquid crystal lens 1000 emits a 3D image signal from a 2D image signal according to the profile of a lens surface, and is located on the display panel 350 that forms a 2D image. The electric field driven liquid crystal lens 1000 may selectively emit a 3D image signal or a 2D image signal according to whether or not voltages are applied thereto. Specifically, the electric field driven liquid crystal lens 1000 has a switching function to display a 2D image when no voltage is applied thereto, or to display a 3D image when voltage is applied thereto.

Although FIG. 9 illustrates a region where the above described column spacer 250 of the second exemplary embodiment is not included in sectional view and thus, illustration of the column spacer 250 is omitted, the column spacer may be formed at the above described maximum lens height portion, or may be formed to correspond to a discontinuous zone of the Fresnel lens.

In addition, although FIG. 9 illustrates a possible alteration of the second exemplary embodiment in which the first electrodes 111 are formed in a single layer, the second electrode 121 is formed on one entire surface of the second substrate 120 and first and second alignment films 113 and 122 are further provided, a description thereof will be omitted for brevity. As shown in FIG. 9, two pixels (P1, P2) correspond to one lens region. However, three or more pixels may correspond to one lens region. In addition, the lens regions L may be tilted at a predetermined angle with respect to the pixels and may be arranged stepwise with respect to the pixels (more particularly, the lens region of an nth pixel horizontal line is shifted from an (n+1)th pixel horizontal line by a predetermined distance).

In the above described electric field driven liquid crystal lens of the present invention, the column spacer, which maintains a gap between both substrates of the lens, is positioned at a location regardless of a lens error or at an abnormal zone having a high possibility of lens error. Defining such a specific location of the column spacer may minimize generation of crosstalk due to the column spacer down to 4% or less.

As apparent from the above description, an electric field driven liquid crystal lens and a stereoscopic display device using the same according to the present invention have the following advantages.

First, distortion in a transmission direction of light due to the spacer is prevented. In the electric field driven liquid crystal lens in which spacers are provided to support both substrates, the spacers take the form of stationary spacers positioned at desired positions. Each stationary spacer is positioned to correspond to the maximum lens height portion having the smallest incidence angle, or is positioned to correspond to a discontinuous lens surface.

Second, it is possible to prevent crosstalk caused by the spacer during stereoscopic display. For example, when the column spacer occupies 0.5% of a total area of the electric field driven liquid crystal lens, total crosstalk caused by distortion of light to be transmitted during stereoscopic display is 4.5%. In the electric field driven liquid crystal lens of the present invention, the stationary spacer is positioned to correspond to the maximum lens height portion having less effect on the transmission direction of light, thereby preventing distortion in the transmission direction of light. In addition, the stationary spacer is positioned to correspond to a discontinuous lens surface having no display function, thereby preventing any effect due to distortion in the transmission of light.

It will be apparent to those skilled in the art that various modifications and variations can be made in an electric field driven liquid crystal lens cell and stereoscopic image display device using the same of the present invention without departing from the spirit or scope of the invention. Thus, it is intended that the present invention cover the modifications and variations of this invention provided they come within the scope of the appended claims and their equivalents.

What is claimed is:

1. An electric field driven liquid crystal lens cell, comprising:
a first substrate and a second substrate arranged opposite each other;
a first plurality of split electrodes formed on the first substrate, each of the first plurality of split electrodes corresponding to one of a plurality of lens regions;
a second electrode formed over an entire first surface of the second substrate;
a voltage source configured to apply differing voltages to the first plurality of split electrodes and the second electrode;
a spacer formed between the first substrate and the second substrate; and
a liquid crystal layer disposed between the first substrate and the second substrate,
wherein the voltage source is further configured to apply different groups of voltages to the first plurality of split electrodes based on a sub region such that the plurality of sub regions defined in each lens region includes maximum heights, respectively and are separated by discontinuous zones,
wherein the voltage source is further configured to apply voltages that gradually increase from a center of the each sub region to the edge of the each sub region, and
wherein the location of the spacer corresponds to the discontinuous zones when voltages are applied to the first plurality of split electrodes and the second electrode.

2. The electric field driven liquid crystal lens cell according to claim 1, further comprising a second plurality of split electrodes formed on the first plurality of split electrodes, each of the second plurality of split electrodes corresponding to one of the plurality of lens regions.

3. The electric field driven liquid crystal lens cell according to claim 2, further comprising an insulating film on the second plurality of split electrodes.

4. The electric field driven liquid crystal lens cell according to claim 1, further comprising an insulating film on the first plurality of split electrodes.

5. The electric field driven liquid crystal lens cell according to claim 1, wherein the spacer is a stationary spacer or column spacer.

6. The electric field driven liquid crystal lens cell according to claim 1, wherein a plurality of lens regions are formed parallel to each other.

7. The electric field driven liquid crystal lens cell according to claim 1, wherein a plurality of spacers are formed parallel to each other.

8. The electric field driven liquid crystal lens cell according to claim 1, wherein each of the plurality of sub regions defined in each lens region has a different maximum height.

9. A stereoscopic image display device, comprising:
a display panel to emit a 2-dimensional (2D) image signal; and
an electric field driven liquid crystal lens configured to convert the 2D image signal into a 3-dimensional (3D) image signal, the electric field driven liquid crystal lens comprising:
a first substrate and a second substrate arranged opposite each other,
a first plurality of split electrodes formed on the first substrate, each of the first plurality of split electrodes corresponding to one of a plurality of lens regions,
a second electrode formed over an entire first surface of the second substrate,
a voltage source configured to apply different voltages to the first plurality of split electrodes and the second electrode,
a spacer formed between the first substrate and the second substrate, and
a liquid crystal layer disposed between the first substrate and the second substrate,
wherein the voltage source is further configured to apply different groups of voltages to the first plurality of split electrodes based on a sub region such that the plurality of sub regions defined in each lens region includes maximum heights, respectively and are separated by discontinuous zones,
wherein the voltage source is further configured to apply voltages that gradually increase from a center of the each sub region to the edge of the each sub region, and
wherein the location of the spacer corresponds to the discontinuous zones when voltages are applied to the first plurality of split electrodes and the second electrode.

10. The stereoscopic image display device according to claim 9, further comprising a voltage regulation source to emit an image of the display panel by applying no voltage to at least one of the first plurality of split electrodes and the second electrode, and to form a Fresnel lens on a per lens region basis by applying different groups of voltages to the first plurality of split electrodes on a sub region basis to allow a plurality of sub regions defined in each lens region to have the different maximum heights and applying a threshold voltage to the second electrode.

11. The stereoscopic image display device according to claim 9, wherein the spacer has a diameter equal to or smaller than a width of the discontinuous zone of the sub regions.

12. The stereoscopic image display device according to claim 9, wherein the electric field driven liquid crystal lens cell further comprises a second plurality of split electrodes formed on the first plurality of split electrodes, each of the second plurality of split electrodes corresponding to one of the plurality of lens regions.

13. The stereoscopic image display device according to claim 9, wherein the spacer is a stationary spacer or column spacer.

14. The stereoscopic image display device according to claim 9, wherein a plurality of lens regions or spacers are formed parallel to each other.

15. The stereoscopic image display device according to claim 9, wherein each of the plurality of sub regions defined in each lens region has a different maximum height.

* * * * *